United States Patent
Oftedahl et al.

(10) Patent No.: US 6,449,768 B1
(45) Date of Patent: Sep. 10, 2002

(54) SPLIT LINKED A/B SWITCH APPARATUS

(75) Inventors: Rick Oftedahl, Excelsior; Jeffrey O. Brown, St. Paul; Craig Carlson, Chanhassen; John C. Keller, Minneapolis; Sara Manderfield, St. Paul, all of MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/301,163

(22) Filed: Apr. 28, 1999

(51) Int. Cl.[7] .................... H04N 7/173; H04N 7/16
(52) U.S. Cl. .................... 725/119; 725/116; 725/138; 725/146; 725/148
(58) Field of Search .................... 725/148, 149, 725/144, 146, 107, 119, 127, 114, 116, 117, 138, 147; 348/705

(56) References Cited

U.S. PATENT DOCUMENTS

| | | | | |
|---|---|---|---|---|
| 4,616,256 A | * | 10/1986 | Boutmy .................... | 725/116 |
| 4,696,060 A | | 9/1987 | Oswald | |
| 5,241,610 A | * | 8/1993 | Lebiche et al. .......... | 359/118 |
| 5,282,193 A | | 1/1994 | Iino et al. | |
| 5,287,186 A | * | 2/1994 | Takamori .................... | 348/705 |
| 5,479,650 A | * | 12/1995 | Archibald et al. ........... | 714/4 |
| 5,710,846 A | * | 1/1998 | Wayman et al. ............ | 359/109 |
| 5,926,547 A | * | 7/1999 | Heieis et al. ............... | 725/144 |
| 5,963,843 A | * | 10/1999 | Sit et al. .................... | 725/144 |
| 6,057,948 A | * | 5/2000 | Mizrahi ...................... | 359/110 |

FOREIGN PATENT DOCUMENTS

| | | |
|---|---|---|
| WO | WO98/26500 | 6/1998 |
| WO | WO 99/05802 | 2/1999 |

* cited by examiner

Primary Examiner—John Miller
Assistant Examiner—Scott Beliveau
(74) Attorney, Agent, or Firm—Merchant & Gould P.C.

(57) ABSTRACT

A switch apparatus is used in the transmission of a redundant Cable TV (CTV) signal. The redundant CTV signal can be a symmetric split linked redundant CTV signal or an asymmetric split linked redundant CTV signal. The switch apparatus is capable of handling both the symmetric and asymmetric redundant CTV signal where primary channels are split into multiple parts. The asymmetrical splitting of the primary channels is where one part contains more channels than another part. The switch apparatus includes a plurality of switches and a monitor device to detect a failure in the split signal path before the split signals are combined to be transmitted to downstream end-users. Upon detecting a failure, the switches are switched from primary channels to secondary channels by a controller. After the signal is returned, the switches are switched back to the primary channels. A delay timer may be included in the switch apparatus to avoid incidental or temporary signal recovery.

26 Claims, 8 Drawing Sheets

SPLIT LINKED A/B SWITCH APPARATUS

FIELD OF THE INVENTION

The present invention relates to a switch apparatus used in the transmission of redundant audio and video signals, such as Cable TV (CTV) signals. More particularly, the present invention relates to a switch apparatus used in the transmission of redundant Cable TV (CTV) signals including symmetric and asymmetric redundant CTV signals.

BACKGROUND OF THE INVENTION

In recent years, the cable television industry has grown tremendously, with the likelihood of continuing to grow in future years. Future growth could enable the cable television industry to provide hundreds, possibly thousands of cable television channels to consumers. As the cable television industry offers more and more channels, it has become increasingly important to maintain a higher level of signal quality and to minimize breakdowns in cable television systems in order to avoid loss of service to customers.

It is known that a failure in less, split channels is more readily detected than a failure in more, combined channels. Accordingly, a CTV signal is typically divided or split into multiple circuit paths to aid in maintaining a higher level of signal quality when carried on fiber-optic transmission lines.

Also, a secondary CTV signal is used as a backup in case the primary CTV signal fails in order to minimize breakdowns in the system. For economical reasons, the secondary CTV signal is not divided or split since it is rarely used in the transmission of the CTV signal to the end user. The primary CTV signal is divided or split into multiple parts or circuit paths.

The division or splitting of the CTV signal may be asymmetric, where one part may contain more channels than another part. To avoid the asymmetric effects caused by the division or splitting at the receiving end, a typical practice in the CTV environment is to immediately combine the split CTV signals at the earliest convenient point after they are received. However, if there is a failure in the transmission of the signals, for example a cable cut, an optic-electric converter malfunction, or a bad electrical connection, etc., it is difficult to monitor the changes from a combined signal to promptly detect a failure. As a result, switching from the primary signal path(s) to the secondary signal path may not be timely. The transmitted signals may be interrupted without backup. The repair service may be delayed to correct the problem. Such interruptions or delays are expensive to the cable television industry and result in customer frustration and dissatisfaction.

Accordingly, there is a need for a switch apparatus to adapt to a secondary backup path to minimize signal breakdowns. Also, there is a need for such a switch apparatus to accommodate split-linked primary signal paths to maintain a higher level of signal quality and to readily detect a failure. Further, there is a need for such a switch apparatus to be immune from the asymmetry effects caused in the division or splitting of a redundant signal, e.g. a redundant CTV signal.

The present invention provides a solution to these and other problems and offers advantages over the prior art.

SUMMARY OF THE INVENTION

The present invention relates to a switch apparatus used in the transmission of redundant audio and video signals, such as Cable TV (CTV) signals. More particularly, the present invention relates to a switch apparatus used in the transmission of redundant Cable TV (CTV) signals including symmetric and asymmetric redundant CTV signals.

The present invention provides a switch apparatus which interconnects a redundant CTV signal. A redundant CTV signal can be defined as having a primary CTV signal and a secondary CTV signal. The present invention also provides a switch apparatus which interconnects a symmetric redundant CTV signal and an asymmetric-redundant CTV signal. A symmetric redundant CTV signal can be defined as a signal which is divided or split into multiple signal paths or channel paths, where each path contains the same amount of channels. An asymmetric redundant CTV signal can be defined as a signal which is divided or split into multiple signal paths or channel paths, where one path may contain more channels than another part.

In a normal operation, the switch apparatus is operated in a first position. Each of the primary signal paths is monitored such that when there is a failure in any one of the primary signal paths, the switch apparatus is switched to a second position. The secondary channels are then connected and outputted to the end user. When the failed primary signal path is returned, the switch apparatus is switched back to the first position. The primary signal paths are combined, and the combined signals are outputted to the end user. A timer may be used to provide a delay for the switching back in case that the recovery from the failure is temporary.

In one embodiment of the present invention, the primary channels are divided or split into two signal paths, and the secondary channels are not divided or split and include the same channels as the combination of all primary channels. The switch apparatus which is adapted to the split primary channels and the non-split secondary channels has the advantages of minimizing breakdowns, maintaining a higher level of signal quality when the CTV signal is carried on fiber-optic transmission lines, and readily monitoring for failures. Many other advantages of the present invention are also provided. For example, the switch apparatus of the present invention is immune to the asymmetric effects caused in the splitting of the primary channels, where one part contains more channels than the other part.

In one embodiment of the present invention, a switch apparatus comprises: a first input port including a first switch for switching between a first position to input a first set of primary channels and a second position to connect to a termination; a second input port including a second switch for switching between a first position to input a second set of primary channels and a second position to input a set of secondary channels, the set of secondary channels including the sum of the first and second sets of primary channels; a controller for controlling the first switch and the second switch, wherein when the controller detects a predetermined condition, the controller switches the first and second switches simultaneously from the first positions to the second positions, and when the controller detects that the predetermined condition is over, the controller switches the first and second switches simultaneously from the second positions to the first positions; and an output port including a combiner for outputting combined first and second sets of primary channels when the first and second switches are switched to the first positions, and for outputting the set of secondary channels when the first and second switches are switched to the second positions.

According to one aspect of the present invention, the controller includes a first monitor for monitoring a condition of the first set of primary channels proximate at the first input port; and a second monitor for monitoring a condition of the second set of primary channels proximate at the second input port. When the condition in either of the first and second sets of primary channels reaches the predetermined condition, the controller switches the first and second switches from the first positions to the second positions.

Another aspect of the present invention is that the controller includes a timer. When the predetermined condition is over, the controller switches the first and second switches from the second positions to the first positions after a period defined by the timer.

A further aspect of the present invention is that the first set of channels includes more or less channels than the second set of channels. Alternatively, the first set of channels includes the same number of channels as the second set of channels.

The present invention also provides a cable system for transmitting primary channels which are split into at least two sets and secondary channels from a head-end of a receiver to an end user. The cable system comprises: the head-end for receiving signals, and cables for transmitting the primary channels and the secondary channels to a hub. The hub comprises a switch apparatus including: a first input port including a first switch for switching between a first position to input the first set of primary channels and a second position to connect to a termination; a second input port including a second switch for switching between a first position to input the second set of primary channels and a second position to input the secondary channels; a controller for controlling the first switch and the second switch, wherein when the controller detects a predetermined condition, the controller switches the first and second switches simultaneously from the first positions to the second positions, and when the controller detects that the predetermined condition is over, the controller switches the first and second switches simultaneously from the second positions to the first positions; and an output port including a combiner for outputting combined first and second sets of primary channels when the first and second switches are switched to the first positions, and for outputting the set of secondary channels when the first and second switches are switched to the second positions.

The present invention also provides a method of switching between primary channels and secondary channels in a receiver of a cable system, the primary channels being split into two sets, comprising: connecting a first switch to a first position and a second switch to a first position; monitoring the first set of primary channels and the second set of primary channels: a) if either-of the first and second sets of the primary channels is in a predetermined condition: 1) switching the first switch to a second position and the second switch to a second position simultaneously; and 2) outputting the secondary channels; b) if neither of the first and second sets of the primary channels is in the predetermined condition: 1) combining the first and second sets of the primary channels; and 2) outputting the combined primary channels.

One aspect of the present invention is that the method further comprises switching from the second positions of the first and second switches to the first positions when the predetermined condition is over. The switching from the second positions to the first positions when the predetermined condition is over may be delayed for a period of time.

Another aspect of the present invention is that the splitting of the primary channels is asymmetric such that the first set of the primary channels has more or less channels than the second set of the primary channels.

Accordingly, the present invention minimizes signal breakdowns, accommodates split-linked primary signal paths to maintain a higher level of signal quality and readily detects a failure, and is immune from the asymmetry effects caused in the division or splitting of a redundant signal.

These and various other features as well as advantages that characterize the present invention will be apparent upon reading of the following detailed description and review of the associated drawings.

DETAILED DESCRIPTION OF THE INVENTION

The present invention relates to a switch apparatus used in the transmission of redundant audio and video signals, such as Cable TV (CTV) signals. More particularly, the present invention relates to a switch apparatus used in the transmission of redundant Cable TV (CTV) signals including symmetric and asymmetric redundant CTV signals.

The present invention provides a switch apparatus capable of handling redundant CTV signals where primary channels are split into multiple parts. The splitting of the primary channels may be asymmetrical where one part contains more channels than another part. The switch apparatus includes switches and a monitor device to detect a failure in the split signal path before the split signals are combined to be transmitted to downstream end-users. Upon detecting a failure, the switches are switched from primary channels to secondary channels by a controller. After the signal is returned, the switches are switched back to the primary channels. A delay timer may be included in the switch apparatus to avoid incidental or temporary signal recovery.

Generally, the present invention relates to a switch apparatus 20 for use in connection with a head-end 22 of a cable television system. The switch apparatus 20 comprises at least two switches simultaneously switched from their first positions to their second positions when there is a failure detected in the received signals and from their second positions to their first positions when the failed received signals are recovered. The switches are adapted for multiple split linked primary channels. One part of the primary channels may contain more channels than another part of the primary channels.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
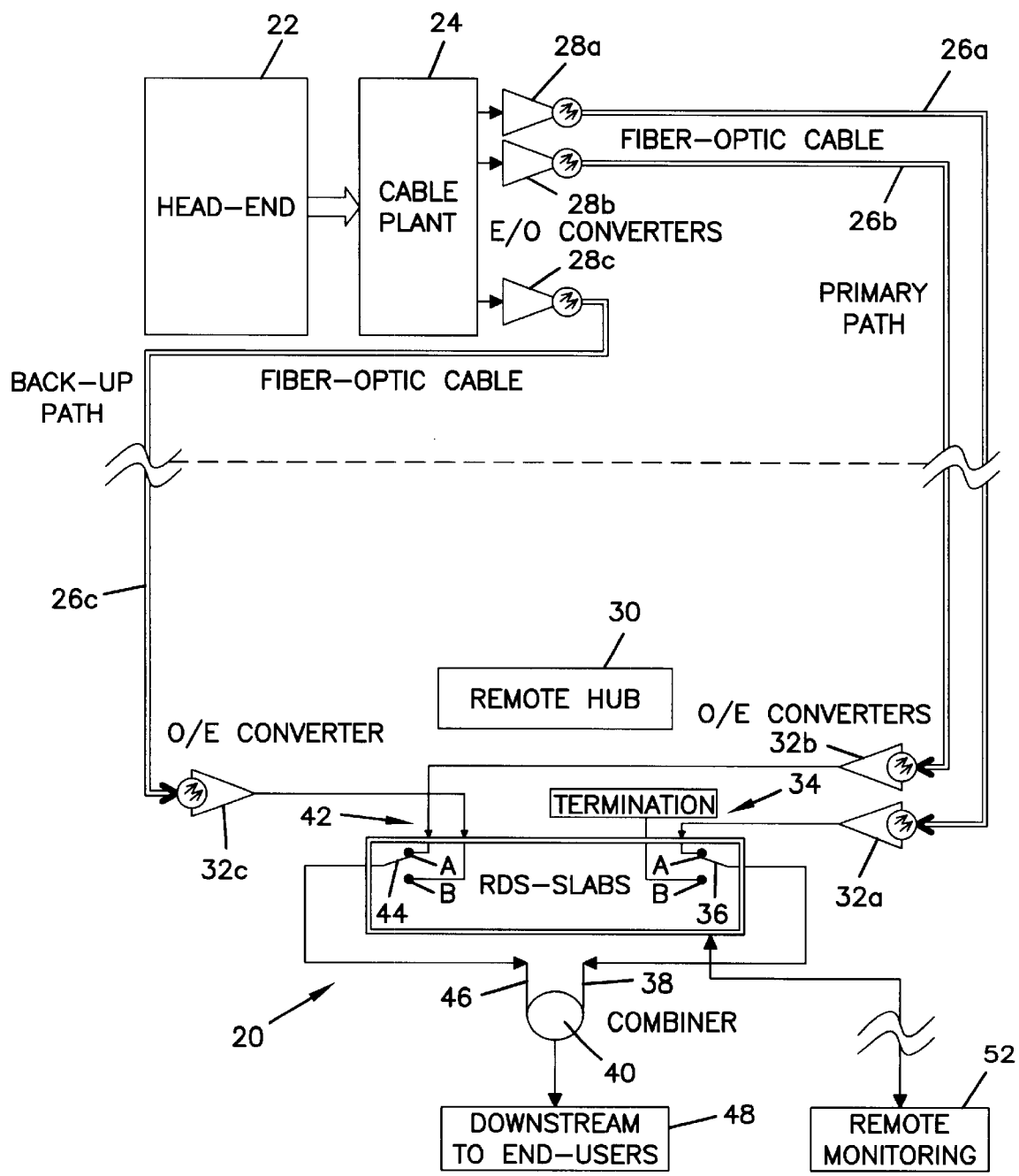
FIG. 1 is a schematic view of a head-end of a cable television system with a split linked A/B switch apparatus included in the system according to the present invention.

In FIG. 1, there is, generally illustrated the switch apparatus 20 for use with a head-end 22, such as a receiver with modulators, and a cable plant 24, such as a set of distributor coaxial cables, in a cable television system. The received electrical signals are transmitted on both primary channels and secondary channels so as to provide a backup for the primary channels in case that the primary channels break down. The primary channels are preferably split into two parts, one is transmitted on primary path 26a, and the other one is transmitted on primary path 26b. The secondary channels are transmitted on back-up or secondary path 26c. The secondary channels are preferably not split. The three paths of electrical signals are converted into optical signals via electro-optic (E/O) converters 28a,28b,28c. The optical signals are then transmitted via fiber-optic cables to a hub 30, where the optical signals are converted back to the electrical signals via optic-electro (O/E) converters 32a,32b, 32c. The hub 30 can be located in a remote site. It is appreciated that the primary channels can be split into more than two parts, and the secondary channels can be split into more than one part.

Further in FIG. 1, the switch apparatus 20 includes an input port 34 having a switch 36 for switching between a first position A and a second position B. When the switch 36 is in the first position A, the primary channels from the path 26a are connected to a first input 38 of a combiner 40. When the switch 36 is in the second position B, the switch 36 is connected to a termination, for example to ground or to a resistor and then to ground. The combiner 40 is not affected by the first input 38.

The switch apparatus 20 also includes a second input port 42 having a switch 44 for switching between a first position A and a second position B. When the switch 44 is in the first position A, the primary channels from the path 26b are connected to a second input 46 of the combiner 40. When the switch 44 is in the second position B, the secondary channels from the path 26c are connected to the second input 46 of the combiner. The switches 36 and 44 are arranged and configured such that the switches 36 and 44 switch to the first positions A simultaneously, and to the second positions B simultaneously. When the switches 36,44 are in the first positions A, the primary channels are connected to the combiner 40. The combined primary channels are then sent to downstream end-users 48. When the switches 36,44 are in the second positions B, the secondary channels are connected to the combiner 40 via the switch 44 and to the downstream the end-users 48.

Figure 5:
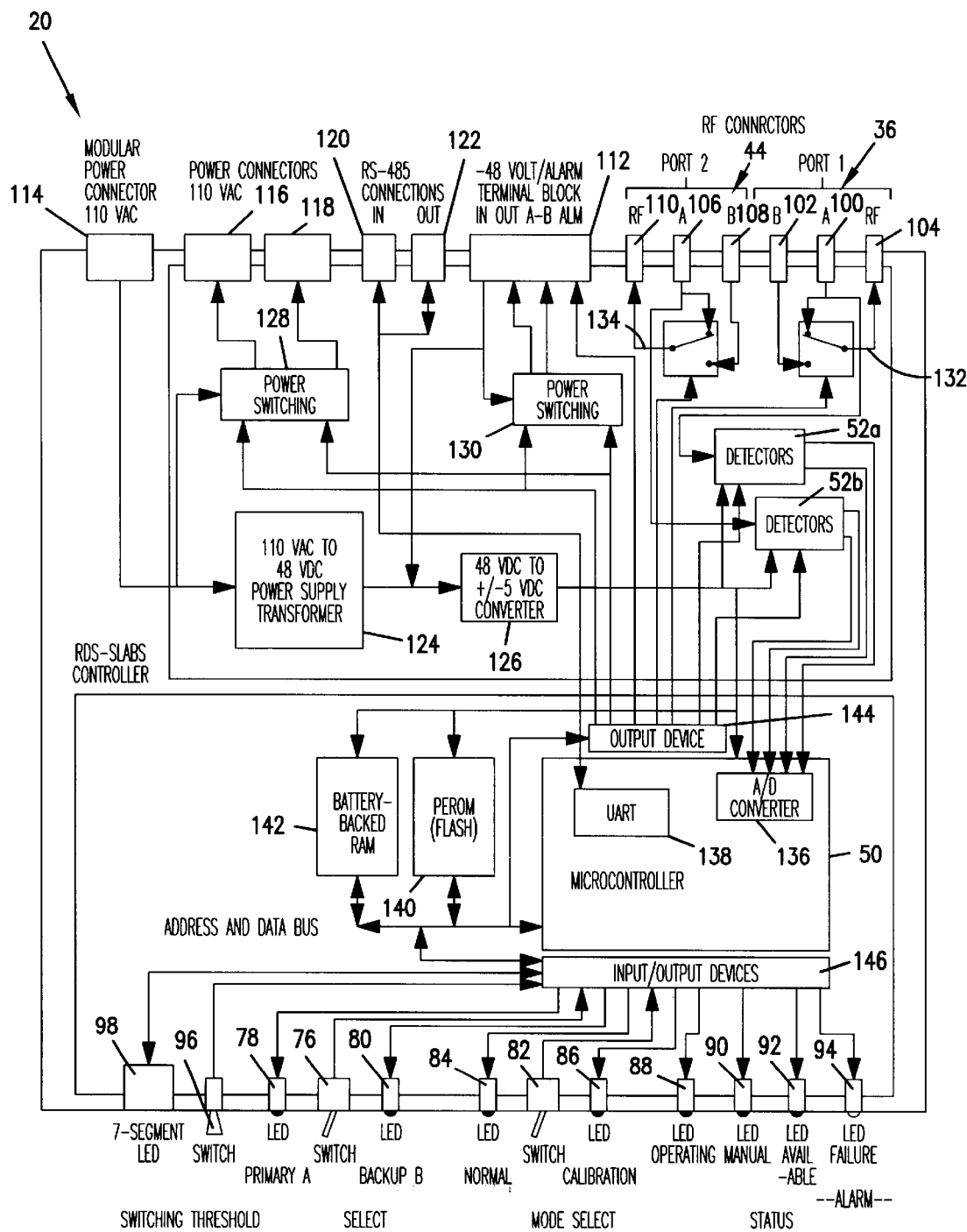
FIG. 5 is a circuit block diagram of the split linked A/B switch apparatus of FIG. 1.

The switching of the switches 36,44 is controlled by a controller, for example, a microcontroller 50 as shown in FIG. 5. A monitor or detector 52 can be used to detect the condition of the signals. If the condition of the signal reaches a predetermined condition, e.g. a failed condition (a failure in the transmission), then the monitor or detector 52 sends a signal to the microcontroller 50 which in turn sends a switching signal to the switches 36,44. The switches 36,44 switch from the first positions A to the second positions B. When the monitor or detector 52 detects the failed condition is over, the microcontroller 50 sends a switching return signal to the switches 36,44. The switches 36,44 switch from the second positions B to the first positions A. The microcontroller 50 may include a timer to delay the switching back in case that the recover from the failure is temporary, e.g. a bad connection of the fiber line. The delayed period can be preset or adjusted by an operator.

Figure 8:
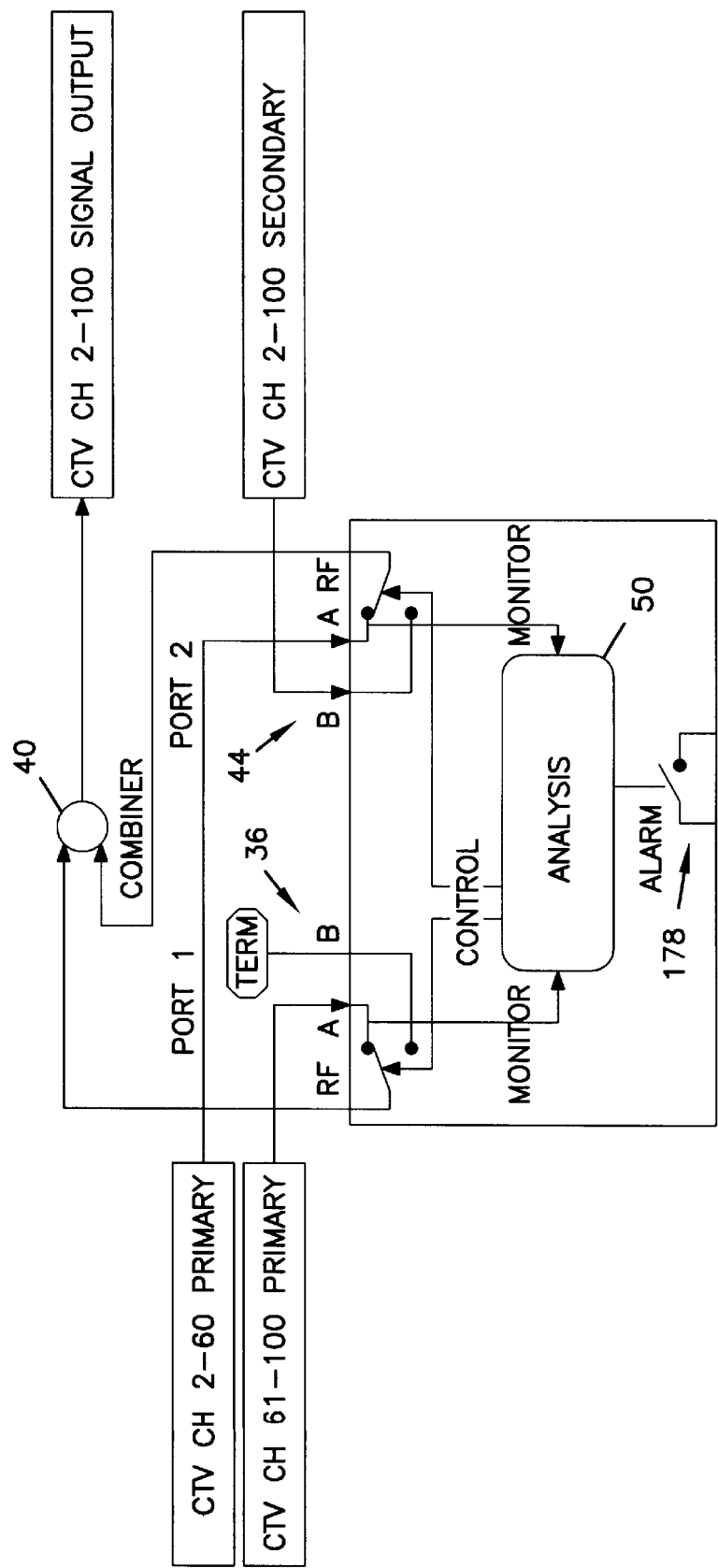
FIG. 8 is an example of the split linked A/B switch apparatus adapted for asymmetrically split CTV primary channels 2–60 and 61–100 and secondary channels 2–100.

The monitoring of signal conditions can be remote. Preferably, the monitor or detector 52 monitors the signal conditions before the first positions A of the switches 36,44 as shown in FIG. 1. Accordingly, if either path of the primary channels fails, the switches 36,44 switch from the first positions A to the second positions B, whereby the secondary channels are used and connected to the downstream end-users. In FIG. 8, an example of a split linked A/B switch apparatus 20 is shown for asymmetrically split CTV primary channels and combined secondary channels. One part of the primary channels has 2–60 CTV channels, and the other part of the primary channels has 61–100 channels. The secondary channels include all 2–100 channels. When there is no failure, the primary channels 2–60 and the primary channels 61–100 pass through switches 44,36 at the first positions A, respectively, and are combined to primary channels 2–100 at the combiner 40 to be sent to the downstream end-users. When there is a failure, the secondary channels 2–100 pass through switch 44 and are sent to the downstream end-users.

Also shown in FIG. 8, the monitor and control are performed by an analysis processor. It is appreciated that the analysis processor can be the microcontroller 50 as discussed above or a controller operated by a software program. The analysis processor can be configured and implemented in accordance with FIG. 7 which are discussed later.

It is also appreciated that the monitoring can be performed at a point after the switches 36,44, i.e. not only the failure of the signals on the primary paths can be detected, but the failure of the signal on the secondary path can also be detected. It will be apparent to a person skilled in the art that a method of detecting both primary and secondary paths can be implemented to provide an alarm in the case that signals in both primary and second paths have failed.

Figure 2:
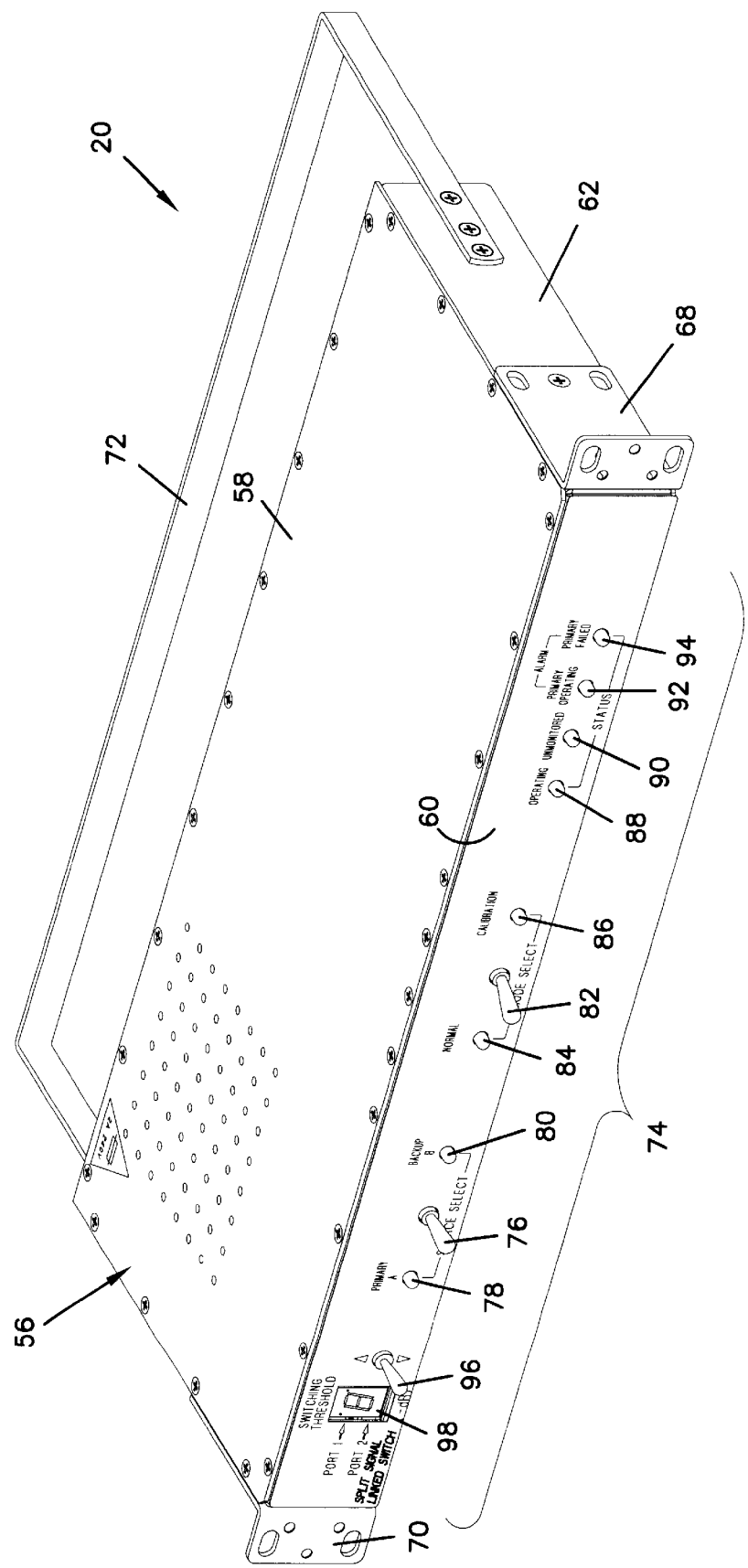
FIG. 2 is a front, top and left side perspective view of the split linked A/B switch apparatus of FIG. 1.
Figure 3:
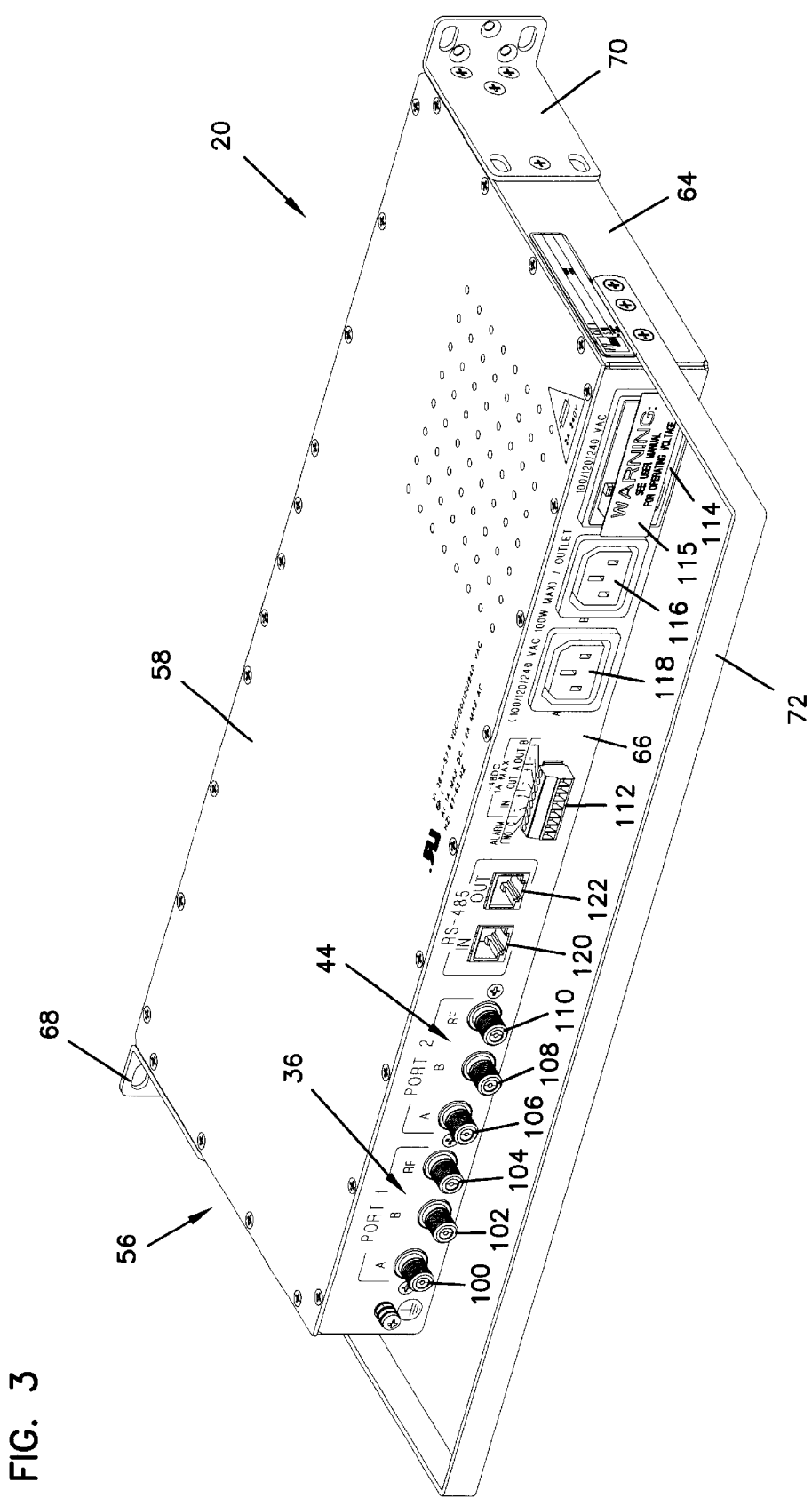
FIG. 3 is a rear, top and right side perspective view of the split linked A/B switch apparatus of FIG. 1.
Figure 4:
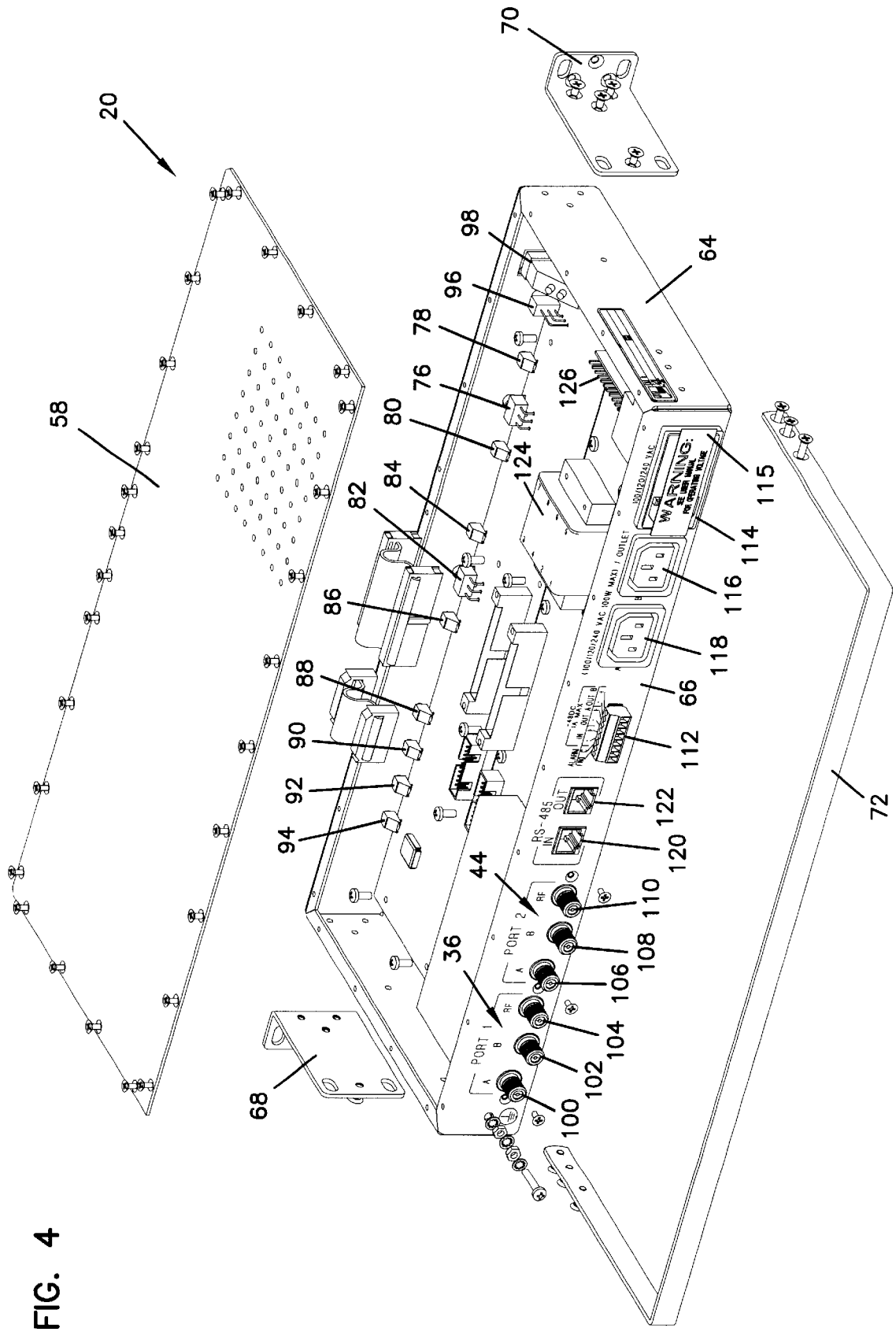
FIG. 4 is an exploded view of the split linked A/B switch apparatus of FIG. 3.

FIGS. 2, 3 and 4 show one preferred external housing frame 56 of the switch apparatus 20 generally according to the present invention. The frame 56 includes an upper panel 58, a front panel 60, a left side panel 62, a right side panel 64, a rear panel 66, and a bottom panel (not shown) substantially parallel to and vertically spaced from the upper panel 58. Left and right brackets 68 and 70 are mounted on the left and right side panels 62 and 64, respectively, adjacent to the front panel 60. The brackets 68 and 70 may be used in mounting the frame 56 into a rack at the remote hub. A handle 72 may be mounted to the frame 56 for ease of handling.

The front panel 60 of the frame 56 provides various manual switches and displays 74 (i.e. 76, 78, 80, 82, 84, 86, 88, 90, 92, 94, 96, and 98) for the switch apparatus 20. A primary-secondary channel selection switch 76 may be provided with the ability to manually toggle between the first positions of the switches 36,44 and the second positions of the switches 36,44. Two LED displays 78 and 80 correspond to the primary channels and the secondary channels, respectively, for indicating which channels have been manually selected by an operator. The implementation of the switching control of the switches 36,44 can be varied. Alternatively, the switches can be electrically actuated, whereby upon receiving a switching signal, the switches switch from one position to the other position.

A mode selection switch 82 may be provided with the ability to toggle between a normal mode indicated by LED display 84 or a calibration mode indicated by LED display 86. Other LED displays 88, 90, 92 and 94 may be provided on the front panel 60 to indicate that the monitor or detector is operating 88 or not operating (unmonitored) 90, or that whether there is a failure in the primary channels 94 or not 92, respectively.

A threshold setting switch 96 is provided on the front panel 60. The threshold setting switch 96 can be toggled upwardly or downwardly to increase or decrease, respectively, a variable tolerance to be used together with a predetermined condition of the monitored signals, against which the actual signals monitored to determine whether the primary channels and/or secondary channels are functioning properly. A display area 98 may be provided on the front panel 60 next to the threshold setting switch 96 to display the variable tolerance set by an operator toggling the threshold setting switch 96. Alternatively, the threshold setting switch 96 can be represented by a different manner, for example, a discrete digital number which represents the threshold levels. It will also be apparent to those skilled in the art that various other component tolerances may be selected by an operator through the use of a separate, designated switch or through the use of a single switch with an additional control switch for controlling which component threshold is currently being selected.

FIG. 3 shows the rear panel 66 of the frame 56. The rear panel 66 includes connectors for the input and output ports of the switches 36,44. The switch 36 at port 1 has input connectors 100,102 interconnecting to the first and second positions A,B, respectively, and an output connector (RF) 104 interconnecting to the downstream end-users. The switch 44 at port 2 has input connectors 106,108 interconnecting to the first and second positions A,B, respectively, and an output connector (RF) 110 interconnecting to the downstream end-users.

The rear panel 66 of the frame 56 also includes power connections. A terminal block 112 receives a negative 48 VDC power supply connection. A power connector 114 receives alternating current (AC) power in a normal household range of 100V to 140V, into the switch apparatus 20 for powering modular components. Prior to the installment, a WARNING label 115 may be used to cover the power connector 114. Additional power connectors 116 and 118 may be used for other purposes, for example to downstream power amplifiers. Finally, in and out communication connectors 120 and 122 may be provided on the rear panel 66. The connectors 120,122 can be connected to the monitor or detector 52.

FIG. 4 illustrates an exploded view of the housing or frame 56 of the switch apparatus 20 with the upper panel 58 opened. A power supply transformer 124 (also shown in FIG. 5) is included in the housing to convert the inputted AC power (110 VAC) to DC power (48 VDC). A power converter 126 is also included in the housing to convert the DC power (48 VDC) to the DC power (+/−5 VDC). It will be apparent to a person skilled in the art that the detailed implementation of the switch apparatus 20 can be varied within the principles of the present invention.

With reference to FIG. 5, a circuit block diagram of the switch apparatus 20 is shown. In addition to the switches 36,44, the monitors or detectors 52a,52b, and the microcontroller 50 as discussed above, a main power switch 128 and a backup power switch 130 may be used for supplying power in case that the main power supply fails.

The detector 52a monitors the signal condition proximate the first position A of the switch 36. The detector 52b monitors the signal condition proximate the second position B of the switch 44. It will be appreciated that the detectors 52a,52b can be implemented to monitor the signal conditions proximate after the toggle positions 132,134, respectively, such that signals in both primary and secondary channels may be monitored.

The monitored signals are sent to the microcontroller 50. The detectors 52a,52b are each connected to an analog-to-digital (A/D) converter 136 of the microcontroller 50. In one embodiment, shown in FIG. 5, these connections are preferably accomplished through two signal flow paths from each of the detectors 52a,52b to the A/D converter 136. In a preferred embodiment, a Philips 80C550 microcontroller is used. This microcontroller has a built-in eight-channel A/D converter and a universal asynchronous receiver-transmitter (UART) for controlling serial communications with other devices. In one embodiment, the UART (138 as shown in FIG. 5) is preferably a DS36954 quad-RS485 driver/receiver manufactured by National Semiconductor. In one embodiment, the microcontroller 50 has a programmable erasable read only memory (PEROM) 140 and a battery-backed RAM 142.

The microcontroller 50 is operatively connected to the switches 36,44 through an output device 144 for providing a switching control signal to each of the switches 36,44. The microcontroller 50 is also connected to the power switching devices and connectors on the rear panel 66 of the switch apparatus 20. Further, the microcontroller 50 provides signals to the displays 78, 80, 84, 86, 88, 90, 92, 94, and 98, and receives signals from the switches 76, 82, and 96, through input/output devices 146.

In FIG. 5, the power connector 114 is also connected to the transformer 124 for converting a normal household AC power e.g. 100–140 volts to a DC power e.g. 48 VDC power. The transformer 124 and the terminal block 112 are connected to the 48 VDC converter 126. From the 48 VDC converter 126, the modular components of the switch apparatus 20 are powered. If the normal power of 110–140 VAC received in the power connector 114 fails, then the 48 VDC power received from the terminal block 112 provides a backup power supply for the modular components.

Figure 6:
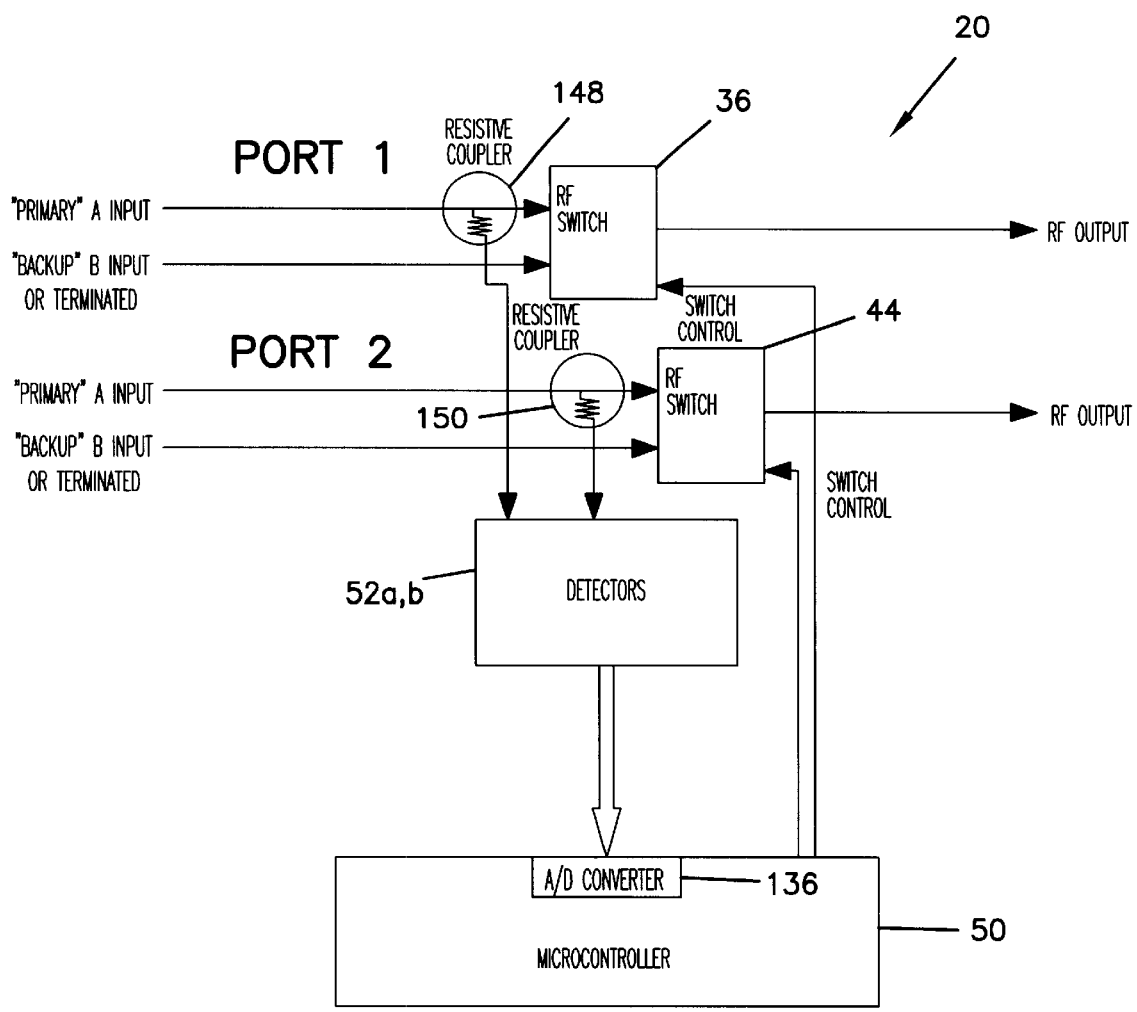
FIG. 6 is a schematic representation of input and output switching functions of the split linked A/B switch apparatus of FIG. 1.

FIG. 6 shows a schematic representation, of input and output switching functions of the split linked A/B switch apparatus 20 in accordance with the present invention. The port 1 includes a primary A input and a backup/secondary (or terminal) B input. The primary A input is monitored by a detector 52a (or 52b) via a resistive coupler 148 before inputting into the RF switch 36 (or 44). The port 2 includes a primary A input and a terminal (or backup/secondary) B input. The primary A input is monitored by a detector 52b (or 52a) via a resistive coupler 150 before inputting into the RF switch 44 (or 36). The detectors 52a,52b are preferably quasi-peak detectors. The detectors transmit the detected total power measured to the A/D converter 136 of the microcontroller 50. The converter 136 converts the analog signal to a digital number. The microcontroller 50 sends switch control signals to the RF switches 36,44. The outputs of the RF switches 36,44 are then sent to the combiner 40 as shown in FIG. 1. It will be appreciated to a person skilled in the art that other types of detectors can be used. For example, the detectors can be heterodyne detectors or square-law detectors.

Figure 7:
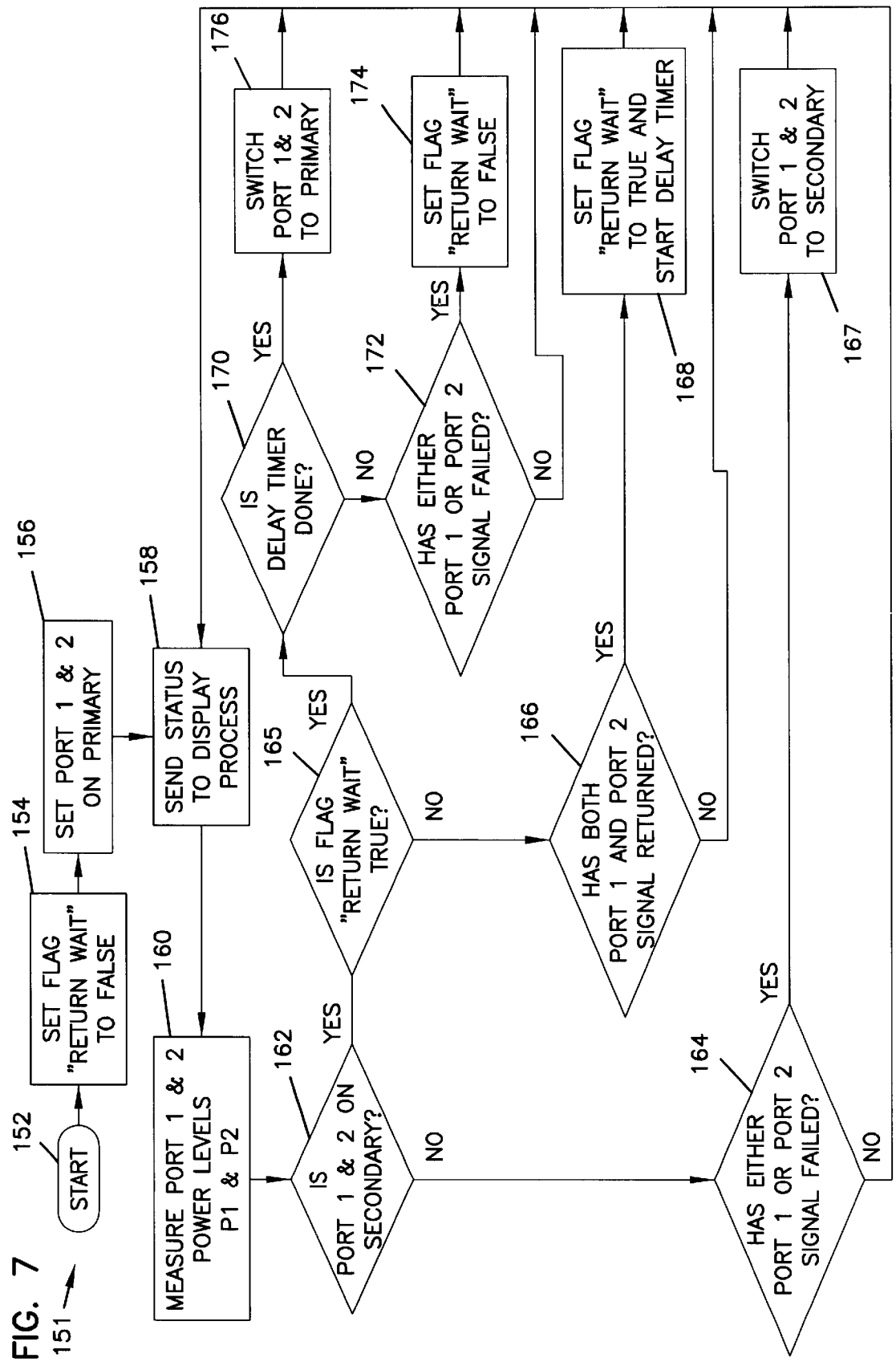
FIG. 7 is a flow chart of a control operation of the split linked A/B switch apparatus.

FIG. 7 shows a flow chart of a control operation 151 of the split linked A/B switch apparatus 20. The operation 151 starts in box 152 with an initiation process performed in boxes 154,156, whereby a "Return Wait" flag is set to FALSE, and the ports 1 and 2 are set on primary, e.g. the switches 36,44 are set at the first positions A. The controller 50 sends the status of the ports to the display in box 158.

The ports 1 and 2 are monitored by the detectors by measuring their power levels P1 & P2 in box 160. Upon receiving the measured power levels, the controller 50 determines whether the ports 1 and 2 are on secondary (e.g. whether the switches 36,44 are at the second positions B) in box 162. If No, the controller then determines whether either of the signals at port 1 and port 2 has failed in box 164. If the controller determines neither signal at the ports 1 and 2 has failed, the operation goes to box 158. If the controller determines either signal at the port 1 or port 2 has failed, the operation goes to box 167 whereby the controller sends a control signal to the switches 36,44 to switch from the primary to secondary (e.g. from the first positions A to the second positions B). The operation then goes to box 158 to display that the switches are now connecting to secondary channels. The detectors continue measuring the power levels at ports 1 and 2 in box 162. If the controller determines that the ports are connected to the secondary channels in box 162, i.e. Yes, the controller determines whether the "Return Wait" flag is TRUE in box 165. If No, the controller determines from the most recent measurements of the power levels of the ports whether the power levels at both port 1 and port 2 are returned or recovered above their threshold power levels or a predetermined condition in box 166. If both ports are recovered, i.e. Yes, the "Return Wait" flag is set to TRUE in box 168. The operation goes back to boxes 158, 160. If the ports are on the secondary in box 162, the operation then goes to box 165. Since the "Return Wait" flag has been set to TRUE, i.e. Yes, the operation goes to box 170 whereby a delay timer process is performed. The controller determines whether the delay timer process is done in box 170. The period of the delay timer can be set to a predetermined time period, e.g. 15 seconds, etc. If the delay timer process is not done, the controller determines from the most recent measurements that whether the signal power level at either port 1 or port 2 has failed in box 172. If No, the delay timer process continues, and the operation goes to box 158. If the signal at either port 1 or port 2 has failed during the delay process, i.e. Yes, the "Return Wait" flag is set to FALSE in box 174, the operation goes to box 158. Accordingly, the delay timer process is terminated, and the period for the delay timer is reset (not shown). If the delay timer process is not interrupted by a further failure, i.e. Yes from box 170, the controller sends a control signal to the switches 36,44 to switch from the secondary to the primary (e.g. from the second positions B to the first positions A) in box 176. Thereafter, the operation continues in box 158. This operation continues until it is terminated by an external source or a predetermined measuring time.

It is appreciated that the sequence or steps of the operation 151 in FIG. 7 can be varied within the scope of the present invention. It is also appreciated that the threshold power level or the period of the delay timer can be varied and/or adjusted without departure from the principles of the present invention. Further, it is appreciated that the switches 36,44 may have a different threshold power level for determining failures and/or a different period of the delay timer for returning within the scope of the invention.)

In FIG. 8, an alarm circuit 178 may be added in the switch apparatus 20 to provide a warning to an operator that a failure has occurred or is detected. The LED lights 92,94 as shown in FIG. 5 can be used to display such warning.

Also as discussed above, FIG. 8 illustrates an example of the split linked A/B switch apparatus 20 adapted for asymmetrically split CTV primary channels 2–60 and primary channels 61–100 and secondary channels 2–100. Since the primary channels 2–60 and primary channels 61–100 are combined after the monitor/control switches 36,44, the switch apparatus 20 is immune to the asymmetry in the splitting of the CTV signal. It is appreciated that the primary channels can be split further into more than two parts. In such a case, additional switches, similar to the switch 36 or 44, can be used in the switch apparatus 20, with one input connecting to the primary channels, and the other input connecting to a terminal. Further, it is appreciated that the secondary channels can also be split into more than one part. In such a case, additional switches and/or switching connections can be used in the switch apparatus 20 without departing from the principles of the present invention.

It is to be understood that even though numerous characteristics and advantages of various embodiments of the present invention have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed.

What is claimed is:

1. A switch apparatus, comprising:
   a first input port including a first switch for switching between a first position to input a first set of primary channels and a second position to connect to a termination;
   a second input port including a second switch for switching between a first position to input a second set of primary channels and a second position to input a set of secondary channels, the set of secondary channels including the sum of the first and second sets of primary channels;
   a controller for controlling the first switch and the second switch, wherein when the controller detects a predetermined condition, the controller switches the first and second switches simultaneously from the first positions to the second positions, and when the controller detects that the predetermined condition is over, the controller switches the first and second switches simultaneously from the second positions to the first positions; and
   an output port including a combiner for outputting combined first and second sets of primary channels when the first and second switches are switched to the first positions, and for outputting the set of secondary channels when the first and second switches are switched to the second positions.

2. A switch apparatus of claim 1, wherein the controller includes a monitor for monitoring a condition of the first set of primary channels proximate at the first input port; when the condition of the first set of primary channels reaches the predetermined condition, the controller switches the first and second switches from the first positions to the second positions.

3. A switch apparatus of claim 2, wherein the controller includes a timer; when the predetermined condition is over, the controller switches the first and second switches from the second positions to the first positions after a period defined by the timer.

4. A switch apparatus of claim 1, wherein the controller includes a monitor for monitoring a condition of the second set of primary channels proximate at the second input port; when the condition of the second set of primary channels reaches the predetermined condition, the controller switches the first and second switches from the first positions to the second positions.

5. A switch apparatus of claim 4, wherein the controller includes a timer; when the predetermined condition is over, the controller switches the first and second switches from the second positions to the first positions after a period defined by the timer.

6. A switch apparatus of claim 1, wherein the controller includes:
   a first monitor for monitoring a condition of the first set of primary channels proximate at the first input port;
   a second monitor for monitoring a condition of the second set of primary channels proximate at the second input port; and
   when the condition either of the first and second sets of primary channels reaches the predetermined condition, the controller switches the first and second switches from the first positions to the second positions.

7. A switch apparatus of claim 6, wherein the controller includes a timer; when the predetermined condition is over, the controller switches the first and second switches from the second positions to the first positions after a period defined by the timer.

8. A switch apparatus of claim 1, wherein the first set of channels includes more channels than the second set of channels.

9. A switch apparatus of claim 1, wherein the first set of channels includes less channels than the second set of channels.

10. A switch apparatus of claim 1, wherein the first set of channels includes the same number of channels as the second set of channels.

11. A cable system for transmitting primary channels which are split into at least two sets and secondary channels from a head-end of a receiver to an end user, the cable system comprising:
    the head-end for receiving signals
    cables for transmitting the primary channels and the secondary channels to a hub;
    the hub comprising a switch apparatus including:
    a first input port including a first switch for switching between a first position to input the first set of primary channels and a second position to connect to a termination;
    a second input port including a second switch for switching between a first position to input the second set of primary channels and a second position to input the secondary channels;
    a controller for controlling the first switch and the second switch, wherein when the controller detects a predetermined condition, the controller switches the first and second switches simultaneously from the first positions to the second positions, and when the controller detects that the predetermined condition is over, the controller switches the first and second switches simultaneously from the second positions to the first positions; and
    an output port including a combiner for outputting combined first and second sets of primary channels when the first and second switches are switched to the first positions, and for outputting the set of secondary channels when the first and second switches are switched to the second positions.

12. A cable system of claim 11, wherein the controller includes a monitor for monitoring a condition of the first set of primary channels proximate at the first input port; when the condition of the first set of primary channels reaches the predetermined condition, the controller switches the first and second switches from the first positions to the second positions.

13. A cable system of claim 12, wherein the controller includes a timer; when the predetermined condition is over, the controller switches the first and second switches from the second positions to the first positions after a period defined by the timer.

14. A cable system of claim 11, wherein the controller includes a monitor for monitoring a condition of the second set of primary channels proximate at the second input port; when the condition of the second set of primary channels reaches the predetermined condition, the controller switches the first and second switches from the first positions to the second positions.

15. A cable system of claim 14, wherein the controller includes a timer; when the predetermined condition is over, the controller switches the first and second switches from the second positions to the first positions after a period defined by the timer.

16. A cable system of claim 11, wherein the controller includes a first monitor for monitoring a condition of the first set of primary channels proximate at the first input port; a second monitor for monitoring a condition of the second set of primary channels proximate at the second input port; when the condition either of the first and second sets of primary channels reaches the predetermined condition, the controller switches the first and second switches from the first positions to the second positions.

17. A cable system of claim 16, wherein the controller includes a timer; when the predetermined condition is over, the controller switches the first and second switches from the second positions to the first positions after a period defined by the timer.

18. A cable system of claim 11, wherein the first set of channels includes more channels than the second set of channels.

19. A cable system of claim 11, wherein the first set of channels includes less channels than the second set of channels.

20. A cable system of claim 11, wherein the first set of channels includes the same number of channels as the second set of channels.

21. A method of switching between primary channels and secondary channels, the primary channels being split into at least two sets, comprising:

connecting a first switch to a first position and a second switch to a first position;

monitoring the first set of primary channels and the second set of primary channels:
  a) if either of the first and second sets of the primary channels is in a predetermined condition:
    1) switching the first switch to a second position and the second switch to a second position simultaneously; and
    2) outputting the secondary channels;
  b) if neither of the first and second sets of the primary channels is in the predetermined condition:
    1) combining the first and second sets of the primary channels; and
    2) outputting the combined primary channels.

22. A method of claim 21, further comprising switching from the second positions of the first and second switches to the first positions when the predetermined condition is over.

23. A method of claim 22, further comprising delaying a period of time before switching from the second positions to the first positions when the predetermined condition is over.

24. A method of claim 21, wherein the splitting of the primary channels is asymmetric such that the first set of the primary channels has more channels than the second set of the primary channels.

25. A method of claim 21, wherein the splitting of the primary channels is asymmetric such that the first set of the primary channels has less channels than the second set of the primary channels.

26. A method of claim 21, wherein the splitting of the primary channels is symmetric such that the first set of the primary channels includes the same number of channels as the second set of the primary channels.

* * * * *